(12) United States Patent
Blech et al.

(10) Patent No.: US 9,789,431 B2
(45) Date of Patent: Oct. 17, 2017

(54) CLEANING DEVICE FOR A DUST FILTER

(71) Applicant: Himenviro Deutschland GmbH, Velbert (DE)

(72) Inventors: Markus Blech, Düsseldorf (DE); Vassilios Toutountsidis, Velbert (DE)

(73) Assignee: Himenviro Deutschland GmbH, Velbert (DE)

( * ) Notice: Subject to any disclaimer, the term of this patent is extended or adjusted under 35 U.S.C. 154(b) by 0 days.

(21) Appl. No.: 15/215,602

(22) Filed: Jul. 21, 2016

(65) Prior Publication Data

US 2017/0021297 A1    Jan. 26, 2017

(30) Foreign Application Priority Data

Jul. 21, 2015  (DE) .......................... 10 2015 111 825

(51) Int. Cl.
*B01D 46/00*    (2006.01)
*B05B 1/14*    (2006.01)

(52) U.S. Cl.
CPC ............ *B01D 46/0068* (2013.01); *B05B 1/14* (2013.01)

(58) Field of Classification Search
CPC . B01D 46/00; B01D 46/0057–46/0098; B05B 1/14

USPC .................................................. 55/282–305
See application file for complete search history.

(56) References Cited

U.S. PATENT DOCUMENTS 6,604,694 B1 *  8/2003  Kordas .............. B01D 46/0068
                                                          239/398

FOREIGN PATENT DOCUMENTS

| KR | 20/0321528 Y1 | 7/2003 |
| WO | 2009/043332 A1 | 4/2009 |

* cited by examiner

*Primary Examiner* — T. Bennett McKenzie
(74) *Attorney, Agent, or Firm* — Gudrun E. Huckett

(57) ABSTRACT

A cleaning device for a dust filter has a flow duct extending between an entry opening and an exit opening. An annular chamber surrounds the flow duct. Gas-inlet connectors are provided for inflow of pressurized gas into the annular chamber. Nozzle gaps delimited by nozzle-gap walls open toward the flow duct. The annular chamber has an upper annular shell and a lower annular shell interconnected pressure-tightly in a connection region. The gas-inlet connectors are molded on the upper annular shell. The lower annular shell is predominantly flat, extends horizontally or downwardly toward the nozzle gaps, and forms the lower nozzle-gap wall. In order to meet highest demands in terms of hygiene, in the connection region the angle at which the annular shells mutually abut in the annular chamber is at least 90°. Gaps and constrictions are thus avoided.

5 Claims, 3 Drawing Sheets

CLEANING DEVICE FOR A DUST FILTER

BACKGROUND OF THE INVENTION

The invention relates to a cleaning device for a dust filter, having a flow duct which extends between an entry opening and an exit opening, and having an annular chamber which surrounds the flow duct and which is provided with gas-inlet connectors for the inflow of pressurized gas into the annular chamber and, towards the flow duct, is provided with nozzle gaps which are delimited by nozzle-gap walls. The annular chamber is composed of an upper annular shell and a lower annular shell which on the radial outside in a connection region are interconnected in a pressure-tight manner. The gas-inlet connectors are moulded on the upper annular shell; the lower annular shell is designed so as to be predominantly flat, extends horizontally or downwardly towards the nozzle gap and, at the same time, forms the lower nozzle-gap wall.

Cleaning devices of this type are known from KR 20/0321528 Y1 and from WO 2009/043332. Said cleaning devices operate based on the Coandă principle and are employed for cleaning the filter hoses and filter candles of dust filters, to which end the cleaning device is disposed above the filter hose which is open towards the top, or above the filter candle. A flow duct which is surrounded by an annular chamber extends between an entry opening and an exit opening. The annular chamber is supplied from above from a compressed-air reservoir. Said annular chamber is closed on the external wall and is provided on the internal wall thereof with nozzle gaps which open into the flow duct. The nozzle gaps are upwardly and downwardly delimited by nozzle gap walls.

The annular wall is formed and enclosed by two walls which in a connection region which extends along the external periphery are interconnected in a pressure-tight manner. The lower wall runs horizontally or slightly downwardly towards the nozzle gap and, at the same time, forms the lower nozzle gap wall; the upper wall determines substantially the spatial shape of the annular chamber and the volume of the annular chamber.

The potential of use of cleaning devices of this type covers all sectors in which dust filters are industrially employed. One of these sectors is the foodstuff industry, for example, the industry processing milk to milk powder. Particularly stringent hygiene requirements apply to the foodstuff industry and also to the pharmaceutical industry. An infestation with germs may arise in the case of cleaning devices for dust filters when, following wet cleaning, residues of cleaning fluid mixed with residue of product remain in individual parts of the plant. It has been observed that in the case of cleaning devices of the generic type, even where these are conceived for increased hygiene requirements, an infestation with germs may still arise under unfavourable circumstances involving tight cavities and in particular gaps. Small residues of cleaning fluid, possibly mixed with residue of product, may remain there for a prolonged time after the cleaning process.

Therefore, the object of the invention is to provide a cleaning device for a dust filter which meets even the highest hygiene requirements.

SUMMARY OF THE INVENTION

This object is achieved by a cleaning device wherein, in the connection region, the angle (W) at which the annular shells mutually abut in the annular chamber is at least 90°.

In such a cleaning device the angle at which the periphery of the upper annular shell abuts the periphery of the lower annular shell inside the annular chamber is at least 90°. In this manner, the cleaning device is capable of meeting even the highest hygiene standards since an infestation with germs cannot arise in the annular chamber, for instance following preceding wet purging. This is so because the interior of the annular chamber is free of gaps or regions of constriction, in which in the case of the known cleaning devices minimal residues of fluid may accumulate, thus giving rise to an environment which is conducive to the formation of germs.

Advantageous design embodiments of the cleaning device are stated in the dependent claims. Gaps and constrictions in the interior of the annular chamber may be avoided when in the connection region the annular zone of the lower annular shell has a curvature towards the upper annular shell, wherein this curvature is preferably of quarter-circular shape. It is furthermore advantageous when the annular zone of the upper annular shell has a curvature towards the lower annular shell.

It is furthermore proposed for the connection region that the peripheries of the two annular shells mutually abut by way of the end faces thereof. In this case, the end faces of the two walls are preferably machined, for example, ground, to be planar, wherein the common end-face plane in which said end faces are located extends perpendicularly to the central axis of the annular chamber.

BRIEF DESCRIPTION OF THE DRAWINGS

Further details and advantages are derived from the following description with reference to the drawings.

DESCRIPTION OF PREFERRED EMBODIMENTS

The basic construction and the basic operating mode of the compressed-air cleaning device which operates according to the Coandă principle is described in U.S. Pat. No. 6,604,694 B1, and reference is being had to the explanations provided therein.

Figure 1:
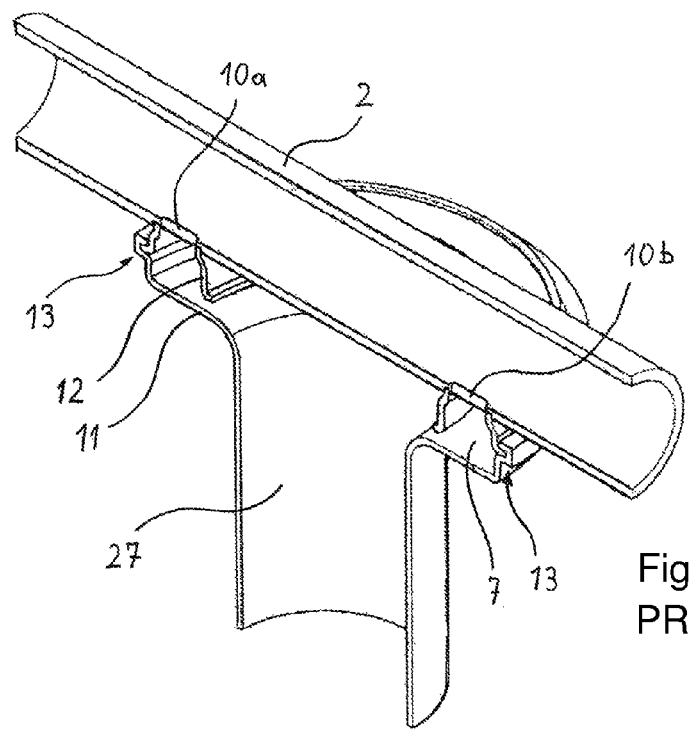
FIG. 1 shows in a perspective view a cleaning device as is known from the prior art.
Figure 2:
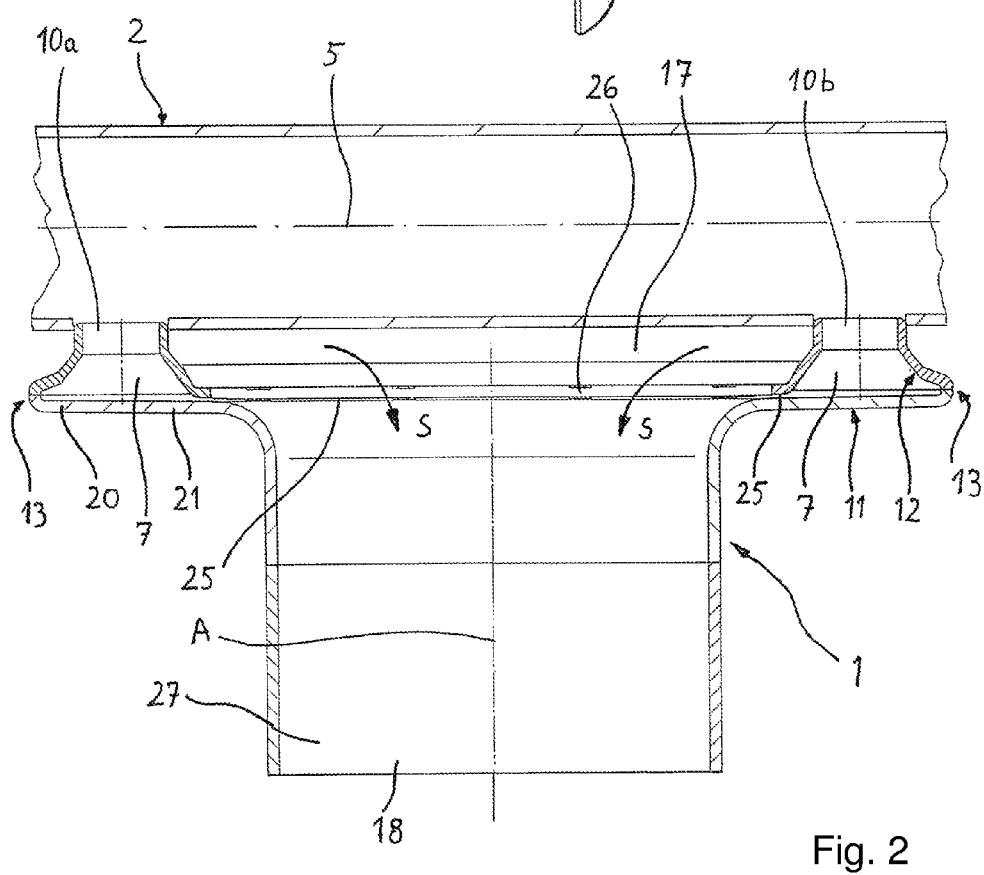
FIG. 2 shows in a sectional view a cleaning device according to the invention.
Figures 3A, 3B:
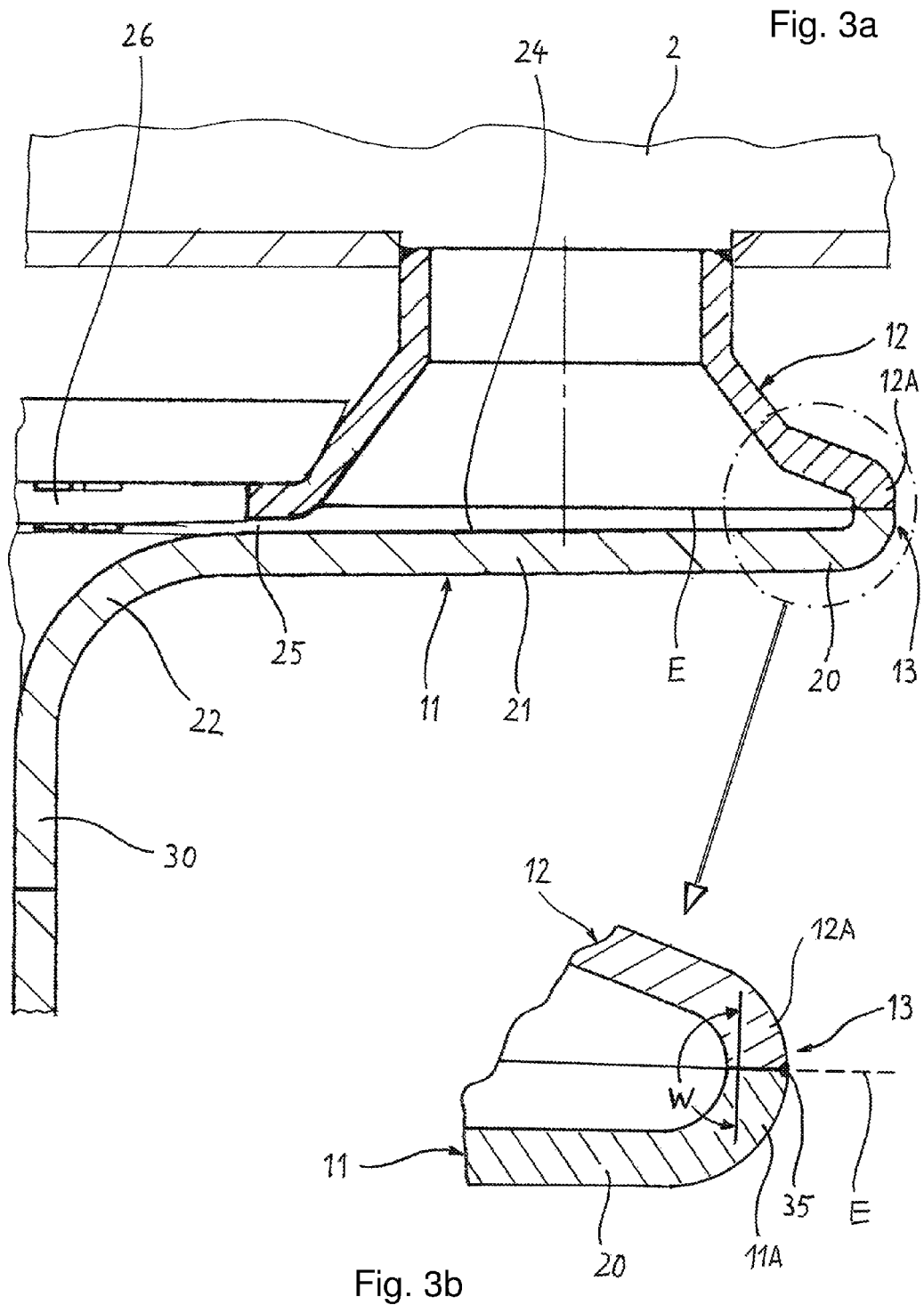
FIG. 3a shows the right part of FIG. 2 in an enlarged view and FIG. 3b shows an even more enlarged detail illustration of the connection region.
Figure 5:
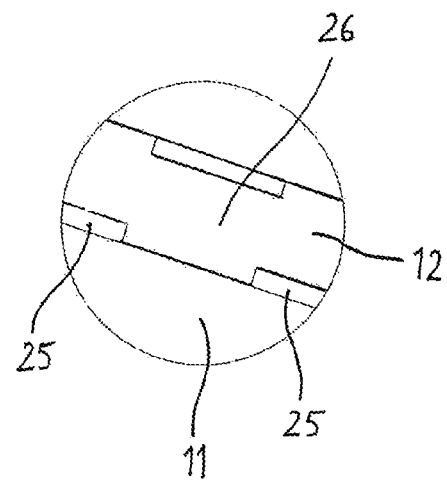
FIG. 5 shows an enlarged section view along section line V-V indicated in FIG. 4.
Figure 4:
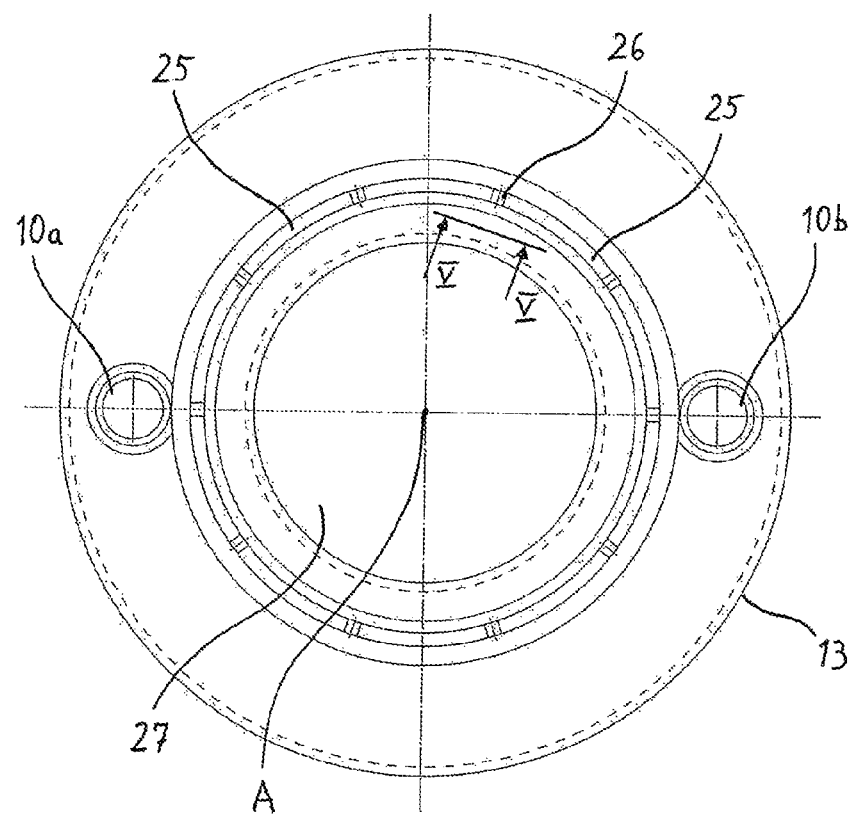
FIG. 4 shows a horizontal section through the cleaning device.

FIG. 1 shows a cleaning device for a dust filter according to the prior art, specifically according to KR 20/0321528 A. A Coandă injector 1 is connected at two points to a compressed-gas line 2 which is disposed above the Coandă injector 1. The Coandă injector 1 is designed so as to be substantially annular such that the central axis A thereof intersects perpendicularly the central axis of the compressed-gas line 2. An annular chamber 7 which is disposed about the central axis A is a component part of the Coandă injector 1. The annular chamber 7 by way of gas-inlet connectors 10a, 10b is connected to the interior of the compressed-gas line 2 at two locations which in relation to the central axis A are oppositely positioned at 180°. Compressed air may flow into the annular chamber 7 by way of the two gas-inlet connectors 10a, 101e at these two locations. During operation, this inflow is performed abruptly since the compressed-gas line 2 by way of a very rapidly switching valve is connected to a compressed-air source having a capacity for very high pressure. When the rapid-action valve is opened, compressed air or another compressed gas abruptly enters the compressed-gas line 2, enters by way of the two gas-inlet connectors 10a, 10b the annular chamber 7, and is distributed across the annular chamber 7.

Self-evidently, a plurality of Coandă injectors 1 are simultaneously connected to one and the same compressed-gas line 2, for example, 10 to 20 Coandă injectors of this type, depending on the size of the dust filter. Moreover, a plurality of compressed-gas lines 2 are disposed parallel to each other in the filter housing, so as to direct in this way compressed air also into adjacent rows of Coandă injectors of this type. In this manner an entire "field" in the housing of the dust filter may be equipped with Coandă injectors of identical type, each such injector being disposed above a filter element of the dust filter.

The annular chamber 7 of the Coandă injector 1 is assembled from two wall parts 11, 12, which in a connection region 13 which extends along the external periphery of the annular chamber 7, are interconnected in a pressure-tight manner. The first wall is an annular shell 12 and the already mentioned gas-inlet connectors 10a, 10b for the connection to the compressed-gas line 2 are moulded thereon. This upper shell 12 is of pronounced three-dimensional shape, having a dome-shaped cross section. The gas-inlet connectors 10a, 10b are moulded thereon at locations which are located opposite each other at 180°.

The other wall is an annular shell 11 which, in radial inward direction, transitions into a tubular piece 30 having a central axis A.

As can be seen in FIG. 1 showing the prior art device, the two annular shells 11, 12 in the connection region 13 are interconnected by a flange connection. While a flange connection on the external periphery of the annular chamber 7 is indeed a connection which in terms of production technology is advantageous, small gaps or cavities may form where the peripheral zones of the annular shells 11, 12 close in on one another; in Such gaps or cavities, following operation of the cleaning device, residues of cleaning fluid mixed with residues of product may deposit. Therefore, the risk of an infestation with germs cannot be completely excluded.

This risk does not exist in the embodiment according to the invention, which is shown in FIGS. 2 to 5. This embodiment will be explained in more detail in the following using the reference characters already used in the context of the prior art device shown in FIG. 1. Therefore, the explanations which have already been given in the context of the prior art device also apply to the cleaning device according to the invention to the extent that they do not pertain to the connection region 13.

Both walls 11, 12 are shells which, in relation to the axis A, are shaped so as to be of annular design and which each are preferably integral press-moulded sheet-metal panel parts.

When viewed radially from the outside to the inside, the lower annular shell 11, which thus is closer to the exit opening 18, can be subdivided into a total of four portions. The external peripheral zone 20 is a component part of the connection region 13 and is designed so as to be connectible in a pressure-tight manner to the other annular shell 12 by welding. This peripheral zone 20 is adjoined radially inwardly by a larger wall portion 21, the upper side 24 of which, facing the annular chamber 7, extends almost horizontally and flat. This flat wall portion 21 extends up to a nozzle gap 25 where the compressed air or the compressed gas, respectively, exits from the annular chamber 7. The flat upper side 24 of the wall portion 21 at the same time forms the lower nozzle-gap wall of the nozzle gap 25.

Downstream of the nozzle gap 25, a transition portion 22 is integrally formed in the shape of a rounded portion that establishes the connection to the tubular piece 30. The tubular piece 30 forms the beginning of a cylindrical flow duct 27 which extends all the way to the exit opening 18. The flow duct 27 is welded to the transition portion 22 or to the short tubular piece 30 of the wall 11.

The transition portion 22 has a quarter-circular shape in cross section so as to enable an interference-free deflection of the gas jet, exiting from the nozzle gap 25 at high velocity, in the direction toward the exit opening 18 of the flow duct 27.

Corresponding to the pressure supply by way of the valve-controlled compressed-gas line 2, the exit of gas from the nozzle gap 25 is also performed in a pulsated manner and at high velocity. The gas, after leaving the nozzle gap 25, follows the profile of the wall (Coandă effect) in the region of the curved transition portion 22 resulting in negative pressure at the center of this polydirectional gas flow. Due to the negative pressure, secondary air is drawn in from above by way of the entry opening 17 into the flow duct 27 such that an increased amount of gas exits from the exit opening 18 at a correspondingly high velocity. The inflow of the entrained secondary air into the entry opening 17 of the Coandă injector 1 is visualized by means of the flow arrows S in FIG. 2.

Since the upper side 24 of the lower annular shell 11, facing the annular chamber 7, extends substantially horizontally or slightly downwardly at least up to the end of the nozzle gap 25, fluid cannot accumulate on the upper side 24 and formation of an atmosphere conducive to an infestation with germs is prevented. Rather, any potential residues of fluids can always run off by way of the nozzle gap 25 and thus escape. In order for this effect to be amplified, the wall portion 21 in a radially inward direction, that is to say toward the central axis A, extends slightly downward, e.g. at an angle of less than 3° relative to the horizontal. It is crucial in this context that there is no location within the annular chamber 7 that is disposed lower than the nozzle gap 25.

In order to avoid gaps, joints, or constrictions that bear the risk of an infestation with germs, on the external periphery of the annular chamber, the angle W at which the periphery 12A of the upper annular shell 12 on the internal side of the annular chamber 7 meets the periphery 11A of the lower annular shell 11 is at least 90°. This angle W is preferably approximately 180°, as is the case with the embodiment of FIGS. 2 to 5.

An angle W of approximately 180° in the connection region 13 may be achieved in that the peripheral zone 11A of the annular shell 11 has a curvature or a bend toward the other annular shell 12, on the one hand, and the peripheral zone 12A of the annular shell 12 also has a curvature or bend toward the annular shell 11 on the other hand. In this way, the end faces of the two annular shells 11, 12 in the connection region 13 mutually abut in a straight line. In order to provide a connection without gaps or constricting regions, the mutually bearing end faces of the two annular shells 11, 12 are moreover ground so as to be planar. Said end faces are located in a common end-face plane E which extends perpendicularly to the central axis A of the annular chamber 7.

For pressure-tight attachment, a weld seam 35 is produced externally on the connection region 13 so as to be level with the end-face plane E, in this way, complete pressure-tightness of the annular chamber 7 is achieved. There are thus no gaps, constrictions, or other small cavities on the inside of the annular chamber wall in which residues of cleaning fluid mixed with residues of product could be deposited following operation of the cleaning device.

The nozzle gap 25 may indeed be a single nozzle gap which extends across the entire circumference. However, in order to calibrate the height of the nozzle gap in a simpler and more reliable manner, preferably a plurality of individual nozzle gaps 25 are provided which are regularly distributed across the circumference and from which the pressurized gas exits radially inwardly. The shells 11, 12 are directly supported on one another along short circumferential portions 26 between mutually successive nozzle gaps 25. On account thereof, it is possible for the height of the nozzle gaps 25 to be precisely dimensioned.

The specification incorporates by reference the entire disclosure of German priority document 10 2015 111 825.4 having a filing date of Jul. 21, 2015.

While specific embodiments of the invention have been shown and described in detail to illustrate the inventive principles, it will be understood that the invention may be embodied otherwise without departing from such principles.

LIST OF REFERENCE CHARACTERS

1 Coandă injector
Compressed-gas line
5 Central axis
7 Annular chamber
10a Gas-inlet connector
10b Gas-inlet connector
11 Lower wall, annular shell
11A Periphery
12 Upper wail annular shell
12A Periphery
13 Connection region
17 Entry opening
18 Exit opening
20 Peripheral zone
21 Rat portion
22 Transition portion
24 Upper side
25 Nozzle gap
26 Circumferential portion
27 Row duct
30 Tubular piece
35 Weld seam
A Central axis
S Flow
E End-edge plane
W Angle

What is claimed is:

1. A cleaning device for a dust filter, the cleaning device comprising:
a flow duct extending between an entry opening and an exit opening;
an annular chamber surrounding the flow duct and comprising gas-inlet connectors for inflow of pressurized gas into the annular chamber;
one or more nozzle gaps fluidically connecting the annular chamber with the flow duct;
the annular chamber comprising an upper annular shell and a lower annular shell, the upper annular shell and the lower annular shell each having an external periphery, wherein the external peripheries of the upper annular shell and the lower annular shell are pressure-tightly connected to each other in a connection region;
wherein the gas-inlet connectors are integrally molded on the upper annular shell;
wherein the lower annular shell is predominantly flat and extends horizontally or downwardly toward the one or more nozzle gaps and forms a lower nozzle-gap wall delimiting the one or more nozzle gaps;
wherein, in the connection region, the upper annular shell terminates in a downwardly facing first end face and the lower annular shell terminates in an upwardly facing second end face resting flat against the first end face, wherein an inner periphery of the upper annular shell and an inner periphery of the lower annular shell in the connection region abut each other at an angle and said angle is at least 90°.

2. The cleaning device according to claim 1, wherein in the connection region an annular zone of the lower annular shell has a curvature in a direction toward the upper annular shell.

3. The cleaning device according to claim 2, wherein the curvature is of a quarter-circular shape.

4. The cleaning device according to claim 1, wherein in the connection region an annular zone of the upper annular shell has a curvature in a direction toward the lower annular shell.

5. The cleaning device according to claim 1, wherein the first and second end faces are machined to be planar and are disposed in a common end face plane which extends perpendicularly to a central axis of the annular chamber.

* * * * *